United States Patent

[11] 3,596,036

| [72] | Inventors | Nicholas V. Ross<br>Youngstown;<br>Reuhl E. Jennings, Warren, both of, Ohio |
|---|---|---|
| [21] | Appl. No. | 19,656 |
| [22] | Filed | Mar. 16, 1970 |
| [45] | Patented | July 27, 1971 |
| [73] | Assignee | Ajax Magnethermic Corporation<br>Warren, Ohio |

[54] INDUCTION HEATER
12 Claims, 14 Drawing Figs.

[52] U.S. Cl.................................................. 219/10.69,
                                                   219/10.41
[51] Int. Cl. ................................................. H05b 5/00,
                                                   H05b 9/06
[50] Field of Search........................................ 219/10.41,
                                                   10.69

[56] References Cited
UNITED STATES PATENTS

| 2,725,450 | 11/1955 | Kuhne et al. | 219/10.69 |
|---|---|---|---|
| 2,876,325 | 3/1959 | Baffrey | 219/10.69 |
| 2,995,641 | 8/1961 | Seulen et al. | 219/10.69 |
| 3,056,876 | 10/1962 | Schmidt | 219/10.41 |
| 3,182,168 | 5/1965 | Cornell | 219/10.69 |
| 3,485,985 | 12/1969 | Ross et al. | 219/10.69 X |

*Primary Examiner*—J. V. Truhe
*Assistant Examiner*—L. H. Bender
*Attorney*—J. H. Slough ABSTRACT: There is disclosed herein an induction heater having an induction coil disposed on a vertical axis and providing a rectangular opening. Means are provided for sequentially inserting a plurality of elongated slabs into the coil adjacent to one side of the coil, each slab being disposed on one side edge in a vertical plane parallel with said one side of the coil, the thickness of the slab being disposed normal to said one side of the coil. Each slab is progressively advanced across the coil in the direction of its thickness to a position adjacent to the side of the coil opposite to said one side, at which position the slab is removed from said coil. Means are provided for applying electrical power to the coil whereby each slab emerges fully and uniformly heated.

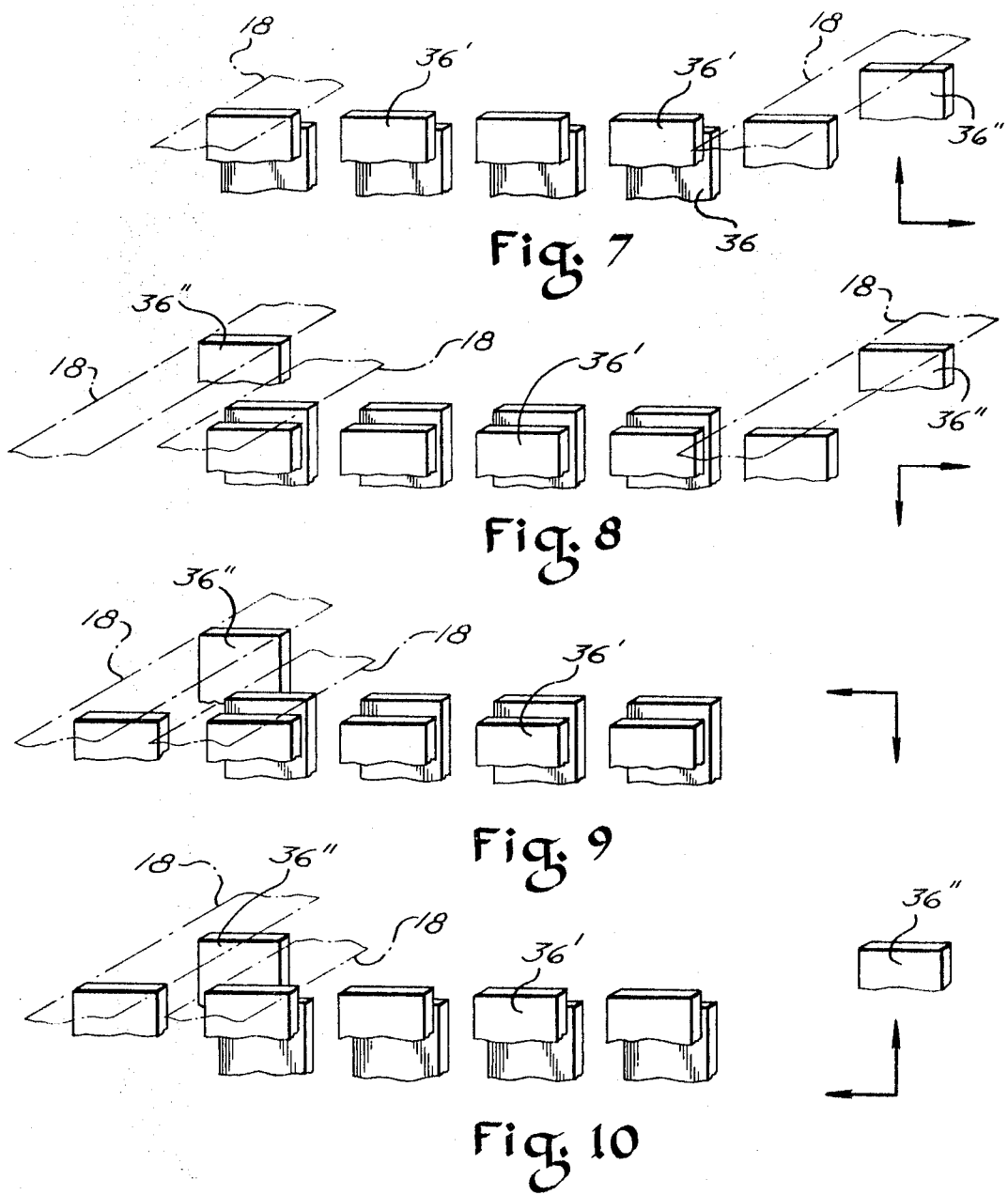

INVENTORS
NICHOLAS V. ROSS
REUHL E. JENNINGS
BY
J. H. Slough
J. H. SLOUGH
ATTORNEY

INVENTORS
NICHOLAS V. ROSS
REUHL E. JENNINGS
BY
J. H. SLOUGH
ATTORNEY

INDUCTION HEATER

This invention relates to induction heating of elongated metal slabs or workpieces of similar shape and particularly relates to heating of a plurality of relatively large metal slabs in a single induction heater in a minimum of time.

The present invention as herein disclosed comprises an induction heater including an induction coil disposed on a vertical axis, each coil turn being of rectangular shape and having parallel, spaced conductor portions at the sides and ends thereof. Means are provided for placing an elongated slab wholly within the induction coil adjacent to selected conductor portions at one side or end of the coil with the longest dimension of the slab disposed parallel with said selected conductor portions and with the slab resting on one of its side edges whereby the selected conductor portions are perpendicular to the thickness of the slabs. A walking beam or other movable support means progressively advances each slab laterally of its longest dimension and in the direction of its thickness to a succession of positions until it reaches a position adjacent to the opposite side or end of the coil at which time the slab is removed from the heater. During the said progressive positional advances of the slab across the heater, power is either continuously or intermittently delivered to the induction coil whereby the slab is progressively heated to the desired final temperature either continuously or in heat-soak-heat stages. New slabs, which may be either cold or preheated in a manner well-known in the art, are sequentially introduced into one side of the heater as the slabs already disposed therein are advanced across the heater to different heating positions and removed whereby the heater affords a substantially high production rate and an induction heating of a plurality of slabs concurrently with an end feed of spaced slabs, each heated to the final desired temperature before exiting the heater.

In general, it is an object of this invention to provide improved means for heating metal slabs or the like in a single induction heater and achieving a high, continuous production rate thereby.

Another object of this invention is to provide an induction heater apparatus adapted to progressively move a slab through a plurality of positions within the heater to heat the slab.

Still another object is to provide an induction heater as set forth above whereby the slabs are contained wholly within the heater when being moved from heating position to heating position and while disposed at each position.

Yet another object of the invention is to provide such an induction heater wherein the induction coil affords a rectangular shaped opening and the slabs are moved transversely across the coil in the direction of the thickness or shortest dimension of the slabs.

A further object of the invention is to provide an induction heater wherein the induction coil affords a rectangular opening and the slabs are moved transversely across the coil and the magnetic field is normal to the longer dimension of the slab.

A still further object of the invention is to provide an induction heater apparatus as set forth above adapted to concurrently heat slabs of different sizes thereby effecting substantial line economies.

A still further object is to provide means for progressively heating slabs at different positions to a predetermined final mill temperature within a single induction coil.

Another object of the invention is to provide an improved method for heating a plurality of slabs at a high production rate within a single induction heater.

Other objects of the invention and the invention itself will be readily understood from the following description and the accompanying drawings, in which said drawings.

Figure 2:
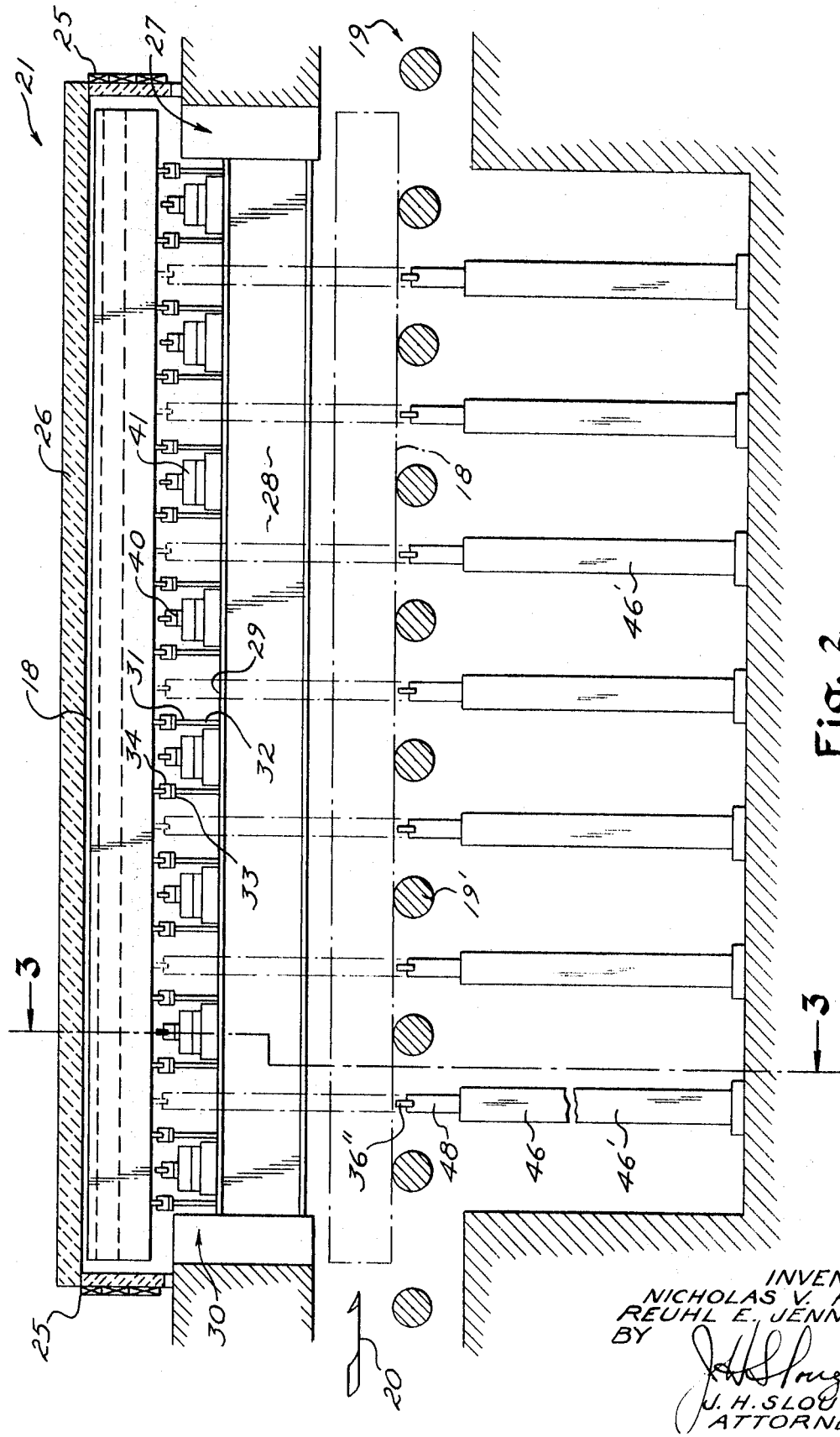
FIG. 2 is generally a longitudinal section through one embodiment of the induction heater of this invention.
Figure 3:
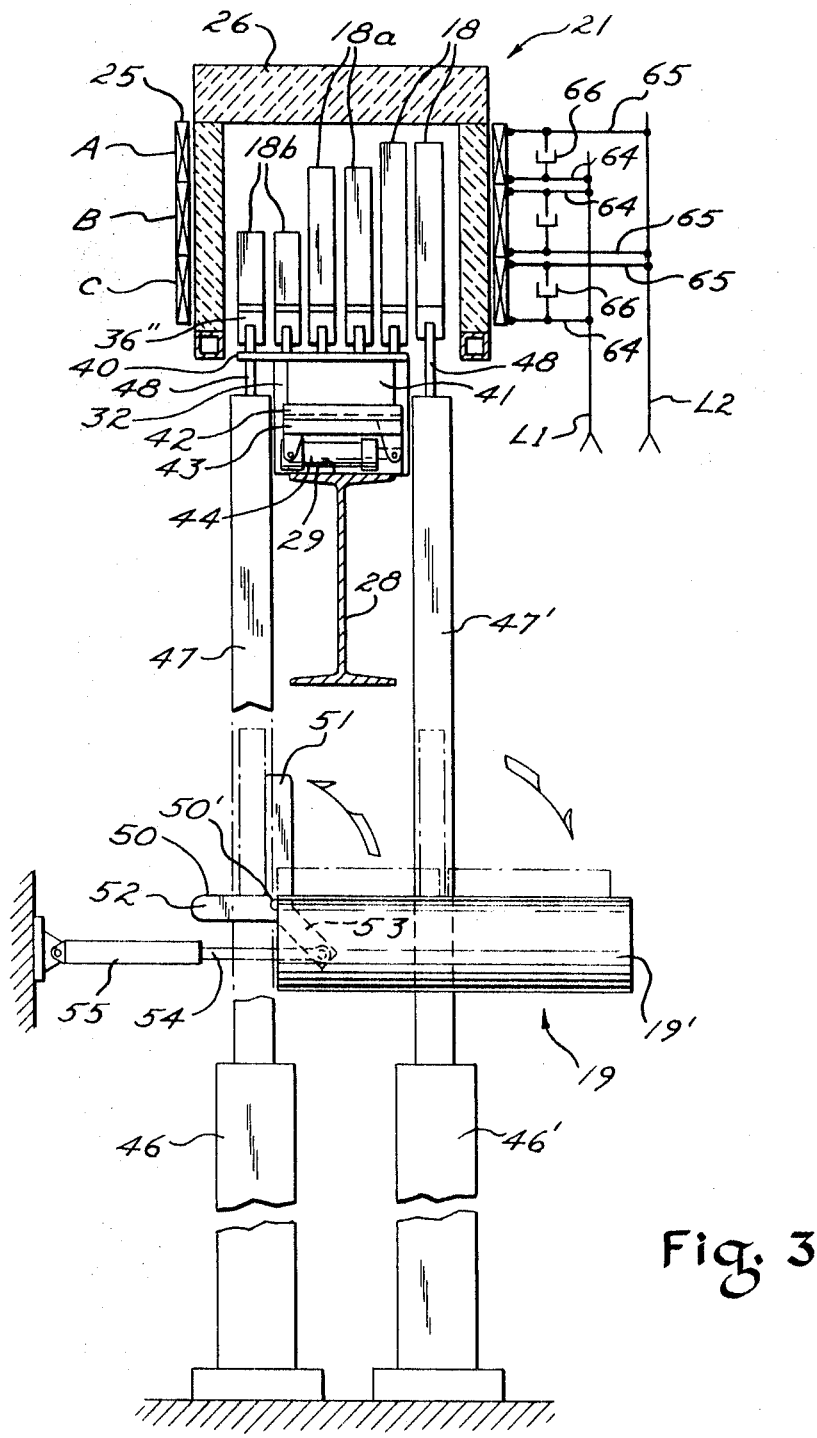
FIG. 3 is an enlarged section taken generally along the line 3-3 of FIG. 2 showing the slab transfer mechanism in one operative position.
Figures 4, 6:
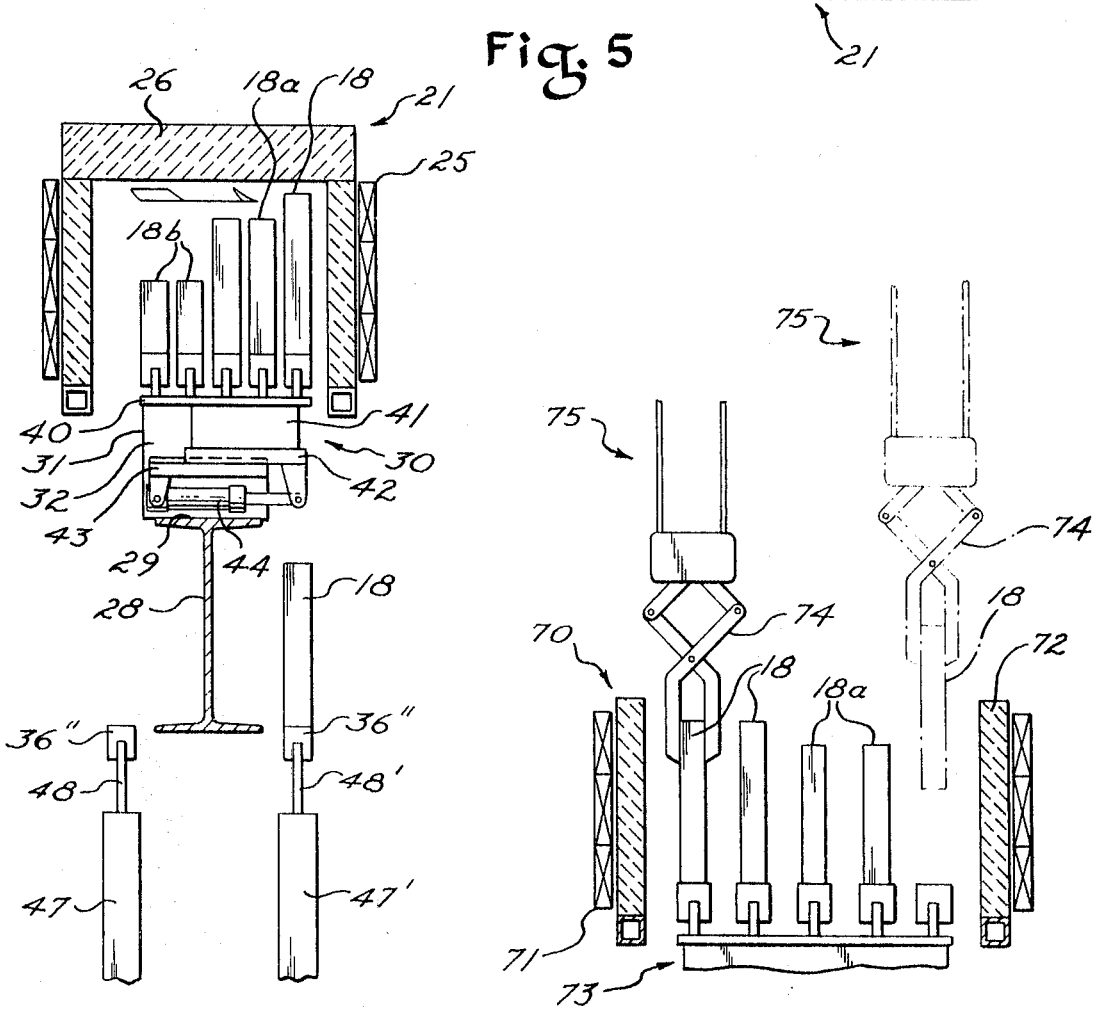
FIG. 4 is a fragmentary section similar to FIG. 3 showing the transfer apparatus in another operative position.
FIG. 6 is a section similar in orientation to FIGS. 3 and 4 showing an alternative method of transferring the slabs.
Figure 11:
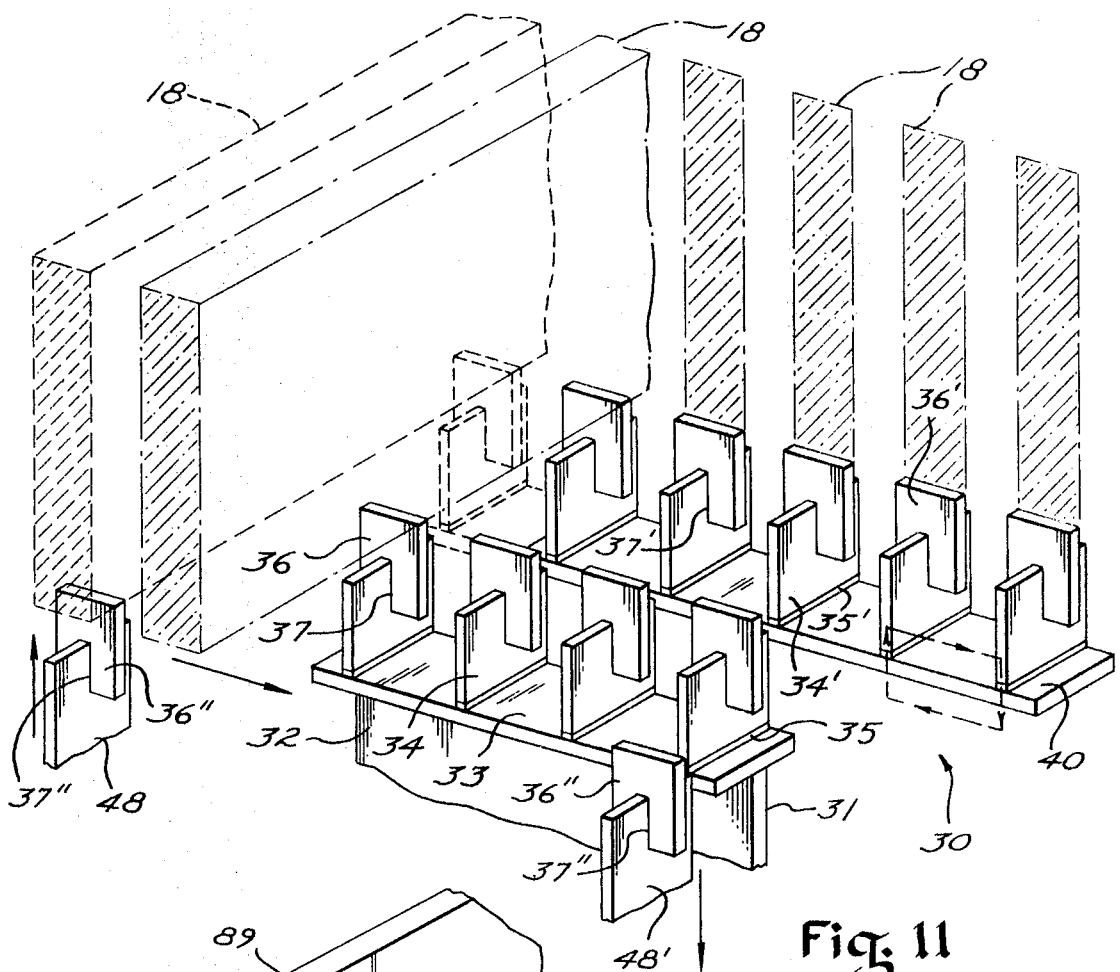
Figure 12:
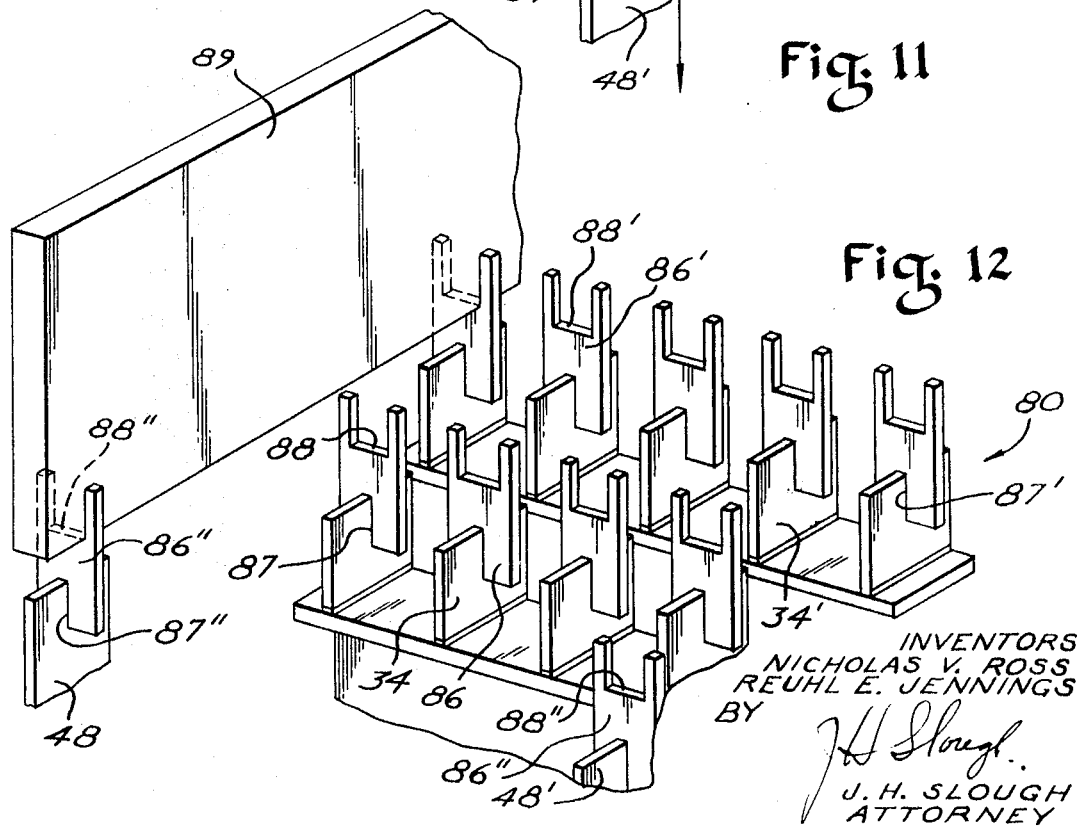
Figure 13:
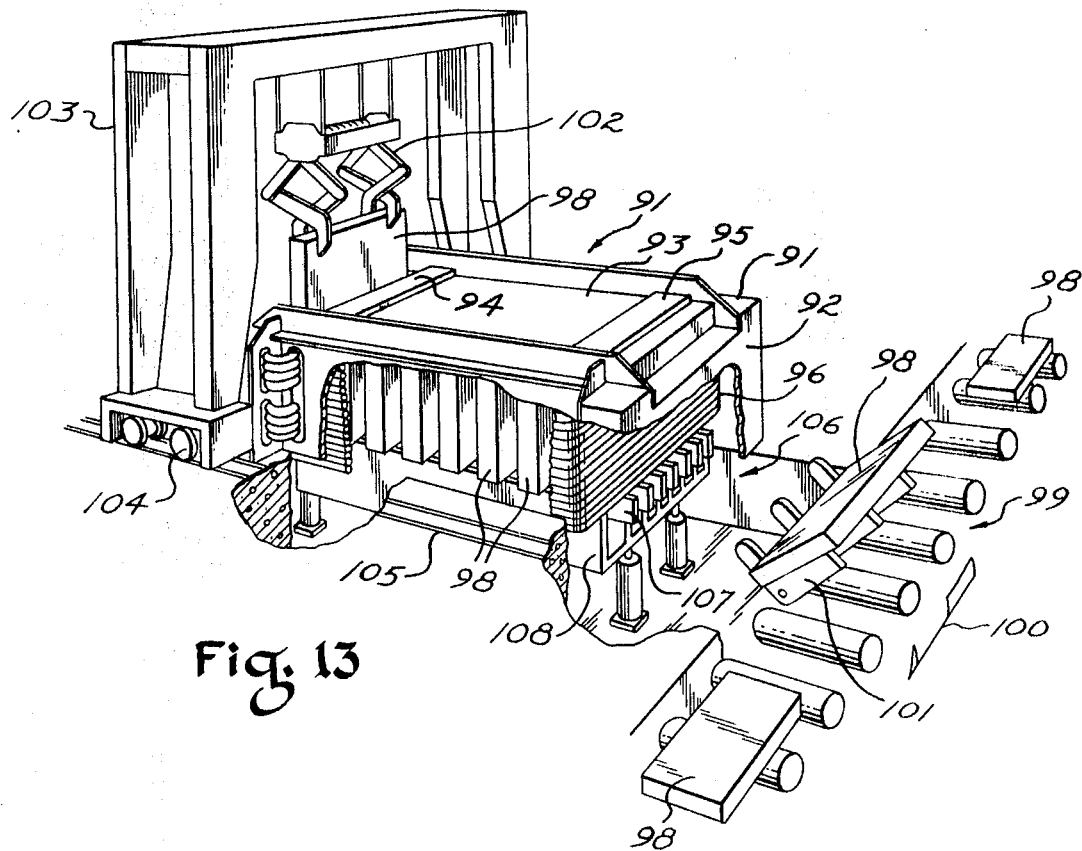
Figure 14:
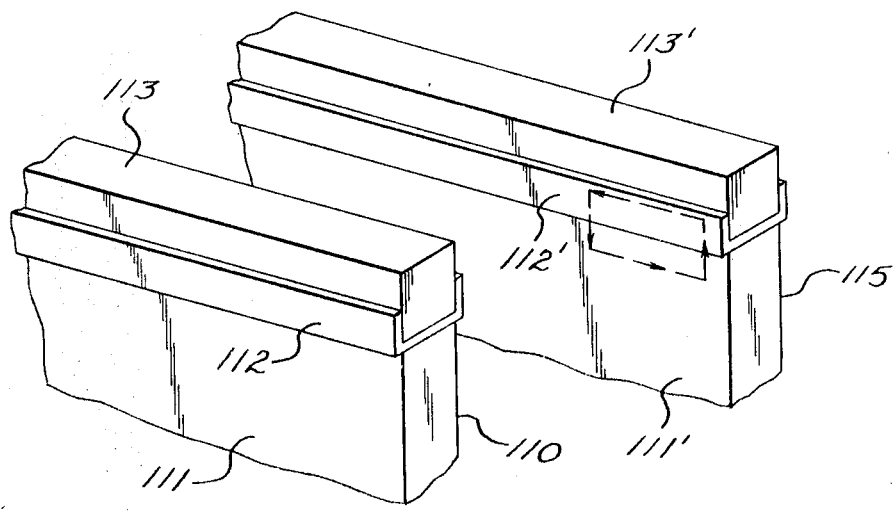

FIGS. 7—10 are fragmentary views respectively showing sequential positions of the movable and support elements in the walking beam of FIGS. 2—4;

FIG. 11 is an enlarged perspective view of the main elements of a walking beam arrangement of the type shown in FIGS. 2—4;

FIG. 12 is a perspective view similar to FIG. 11 showing a modified walking beam apparatus;

FIG. 13 is a perspective view, partially cut away, showing a modified induction heater of this invention; and FIG. 14 is a perspective view showing a still further modified walking beam apparatus.

Figure 1:
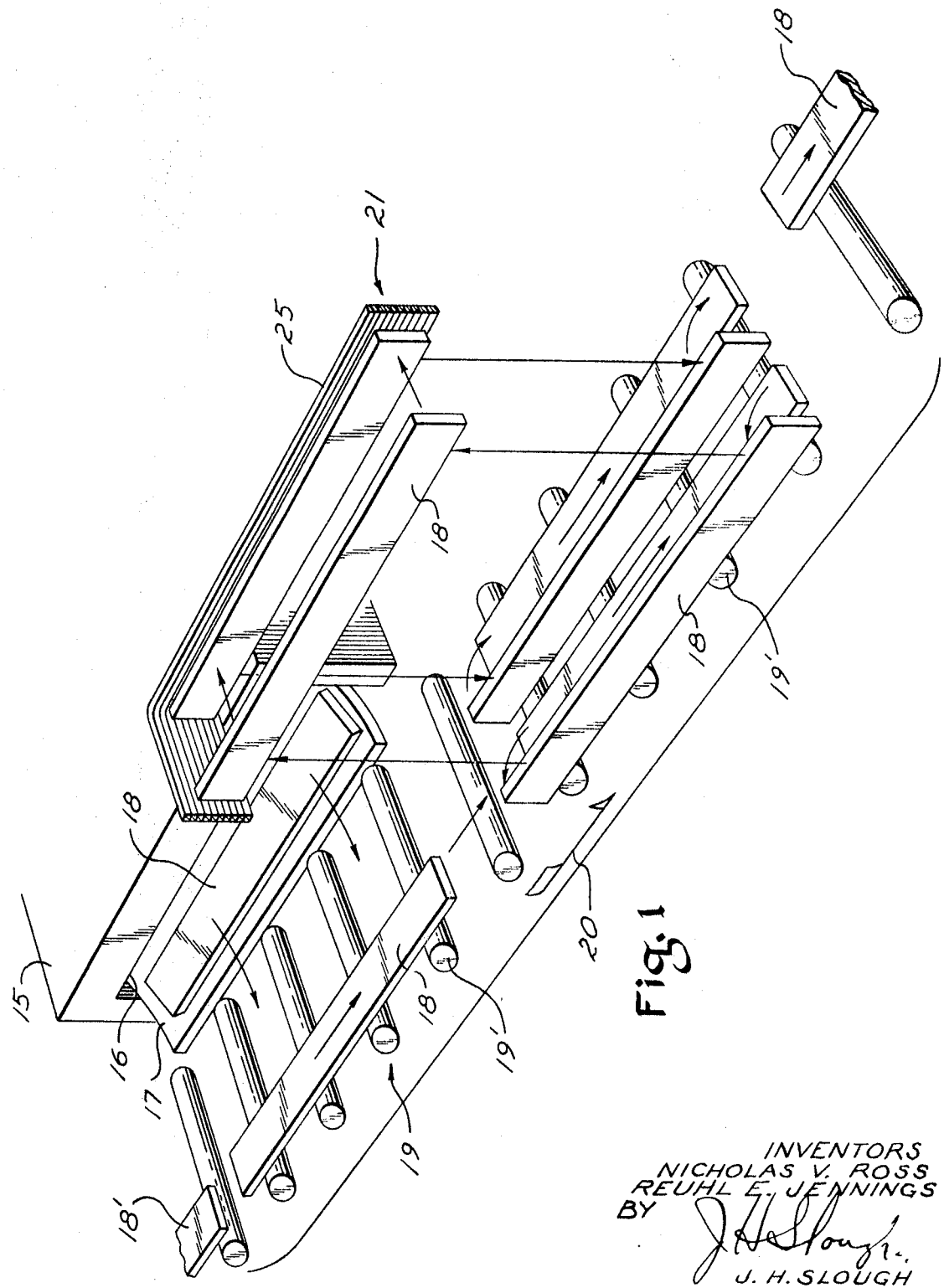
FIG. 1 is a schematic view in perspective showing the various movements of a slab heated in the induction furnace and according to the method of the present invention.

Referring now to the drawings in all of which like parts are designated by like reference numerals, an exemplary embodiment of the present invention is schematically shown in FIG. 1. A preheater such as a gas furnace is indicated at 15, said preheater having a discharge opening 16 and a curved chute 17 by means of which an elongated, rectangular slab 18 is discharged onto a conveyor 19. The slabs 18 are of substantially greater length than width and substantially greater width than thickness and are discharged flatwise onto the conveyor 19 with the longest dimensions disposed parallel with the direction of movement of said conveyor indicated by the arrow 20. The slabs may be fed to the conveyor from different or alternate sources as indicated by incoming slab 18' at the left-hand side of the preheater 15.

Each slab in turn is moved along the conveyor 19 to a position directly below a downwardly open induction heater 21 of sufficient length to accommodate said slabs. Each slab 18 is then rotated 90° whereby said slab is disposed on edge, its width becoming its vertical dimension and its thickness becoming its horizontal dimension transversely of the conveyor. In such on-edge position, the slab is then raised vertically up through the open bottom and into the induction heater 21. As will herein later be described in detail, the coils of the heater are disposed in horizontal planes whereby they are thus disposed parallel with the longest and shortest dimensions of the slabs.

In the first form of the invention, each slab 18 enters the induction heater 21 adjacent to one of the longer sides thereof and while in said heater, it is progressively advanced laterally to a position adjacent to and parallel with the opposite longer side of said heater. During such lateral movement, the slab is heated to the final desired temperature after which it is lowered back to the conveyor 19, rotated 90° to the flatwise position, and then progressively moved by the conveyor toward a mill.

Referring now to FIG. 2 of the drawings, the induction heater 21 comprises an induction coil 25 of oblong, rectangular shape and disposed on a vertical axis whereby said coil defines a rectangular opening for receiving an elongated slab 18. Said heater is preferably provided with suitable refractory lining 26 along the sides, across the ends, and over the top to minimize heat loss while heating the slabs. The induction heater 21 is mounted across a suitable opening or well 27, and an elongated, main support beam 28 is disposed parallel with and spaced below the bottom opening of said heater. The main support beam 28 affords an upper, horizontal flat surface 29 which supports a walking beam apparatus generally indicated at 30. Said walking beam comprises a plurality of stationary supports 31 disposed transversely of the beam 28 and transversely of the longer dimension of the heater 21. Each stationary support 31 comprises a vertical member 32 surmounted by a horizontal plate 33 which, as best seen in FIG. 11, is elongated and rectangular in shape and extends transversely of the main support beam 28. Each plate 33 carries a plurality of flat, rectangular supporting blocks 34 disposed edgewise and in planes parallel with the main support beam 28 and the lengthwise dimension of the induction heater 21. The supporting blocks 34 may be secured to the upper surfaces of the horizontal plate 33 in any suitable manner and are provided with a layer of electrical insulation 35 on their bottom supporting edges. Each supporting block 34, in turn, carries an inverted U-shaped finger 36 having a downwardly open slot 37 by means of which the finger is seated downwardly over its associated block with said block being disposed within said slot.

It will be understood that the fingers 36 are disposed in lines parallel with the supporting beam 28 and parallel with the longitudinal dimension of the heater in such manner as to provide lines of transversely spaced support points for supporting a slab of the type shown at 18. Thus, the stationary supports 31 as herein illustrated are adapted to support four slabs disposed longitudinally of the heater 21.

Intermediate certain pairs of the stationary supports 31 there are provided walking lift beams 40 carried on lift heads 41. As best seen in FIG. 3, each lift head 41 has a transversely slidable base 42 slidably mounted upon a fixed base 43 which is, in turn, secured upon the upper surface 29 of the main support beam 28. Relative movement between the slidable base 42 and fixed base 43 is effected by means of a transversely acting cylinder and piston motor 44 connected at one end to said slidable base and at the other end thereof to said fixed base. As best seen in FIG. 11, each walking lift beam 40 is provided with a plurality of transversely spaced supporting blocks 34' disposed on layers of insulation 35' and carrying inverted U-shaped fingers 36' downwardly slotted at 37' to seat over the supporting blocks as described hereinabove in connection with the stationary supports 31. As herein illustrated, the walking lift beams 40 are each provided with five supporting fingers 36' transversely spaced apart the same distance as those mounted on the stationary supports and with said fingers longitudinally aligned with respect to the heater for supporting slabs of the type shown at 18. The walking lift beams are synchronized to act together and can move laterally from the position shown in FIG. 3 with one set of fingers projecting outwardly beyond the stationary supports in one direction to the position shown in FIG. 4 whereby one set of said fingers projects laterally beyond said stationary supports in the opposite direction. This is also shown in FIG. 11, the full line showing of a walking lift beam corresponding to the position shown in FIG. 4 and the broken line showing corresponding to the position shown in FIG. 3.

The lift heads 41 make it possible to raise and lower the walking lift beams 40 whereby the upper edges of the fingers 36' associated with the walking lift beams are disposed either above or below the upper edges of the fingers 36 carried by the stationary supports 31. Thus, the walking lift beams 40 can not only be shifted laterally beyond either transversely directed end of the stationary supports 31 but can also be raised and lowered above and below the effective supporting levels of said stationary supports.

Referring particularly to FIGS. 2—4, lift means for elevating the slabs into and lowering said slabs from the heater 21 are provided in the form of two rows of lift cylinders 46 and 46' disposed generally below the conveyor 19 between individual rollers 19' thereof. The lift cylinders 46 and 46' are provided with vertical piston rods 47 and 47' surmounted by upwardly projecting blades 48 and 48' carrying transversely oriented fingers 36" of the type shown at 36 and 36', each fingers 36" being slotted at 37" to seat upon a blade 48 or 48'. As best seen in FIG. 3, the rows of lift cylinders 46 and 46' are disposed parallel with the lengthwise dimension of the furnace 21 beneath the open bottom side thereof and adjacent to the longer vertical sides of said heater. When said lift cylinders in both rows are in the raised position as illustrated in FIG. 3, said cylinders provide two additional rows or a total of 6 rows of fingers 36, 36' and 36" uniformly spaced transversely across the heater, each row of fingers representing a position in the progressive advancement of a slab laterally across said heater.

The means by which each individual slab is moved laterally across the induction heater 21 is best understood by reference to FIGS. 7—10 which illustrate sequential relative positions of the fingers 36 of the stationary supports 31, fingers 36' of the walking lift beams 40, and fingers 36" of the lift cylinders 46 and 46'. In FIG. 7, the cylinder and piston motor 44 has moved the walking lift beams 40 to the extreme right-hand position as viewed in said Figure and the lift heads 41 have raised said walking lift beams whereby the fingers 36' are disposed above the fingers 36 of the stationary supports 31. Thus the four left-hand fingers 36' of each walking lift beam are aligned with the fingers 36 of the stationary supports and the extreme right-hand fingers 36' are aligned with and disposed slightly above the fingers 36" of the lift cylinders 46' which are adapted to lower a fully heated slab onto the conveyor 19. In FIG. 8, the fingers 36' are lowered below the adjacent fingers 36 while remaining in the right-hand position whereby a slab positioned on the extreme right-hand fingers 36' of the walking lift beams would be deposited upon the fingers 36" of the lift cylinders 46'. In FIG. 9, the fingers 36' are moved to the extreme left-hand position whereby the extreme right-hand fingers 36 are pulled out from under the heated slab and the extreme left-hand fingers 36' are projected under a new slab which has been elevated by the lift cylinders 46. In FIG. 10, the fingers 36' of the walking lift beams 40 are in the raised position whereby the new slab on the left-hand side is lifted off of the fingers 36" of the lift cylinders 46. The fingers 36' are then again moved to the position of FIG. 7 whereby the newly introduced slab is moved to a position above the extreme left-hand fingers 36 of the stationary supports 31, each of the next three slabs is indexed toward the right to another set of fingers 36, and the extreme right-hand fingers 36' are projected outwardly over the lift cylinders 46' which will then retrieve the next fully heated slab. Thus the cycle is repeated with each newly introduced slab being advanced laterally the distance of one position each time a cycle is completed and eventually being deposited upon the lift cylinders 46' to be lowered back on the conveyor 19.

It will be readily understood from the foregoing that the lift cylinders 46 and 46' are raised and lowered once during each cycle, the lift cylinder 46 always moving up with a load positioned on the fingers thereof and the lift cylinder 46' always moving up empty to retrieve a slab which has been advanced all the way across the induction heater 21. When the lift cylinders 46 and 46' are lowered, said cylinders 46 are always empty, having just deposited their load, and the lift cylinders 46' carry a fully heated slab. This latter condition is illustrated in FIG. 4. The lift cylinders are so timed with relation to the walking beam movements that the cylinders 46 retract, pick up a new slab, and elevate the new slab during the time when the fingers 36' are in the right-hand positions of FIGS. 7 and 8 whereby the left-hand slab position within the heater 21 is clear. The descent lift cylinder 46' retract only after the fingers 36' are in the left-hand position of FIG. 9 and return to the elevated position before said fingers 36' are lowered as shown in FIG. 8.

Referring now particularly to FIG. 3, a preheated slab of the type shown at 18 is ejected from the preheater 50 and slides down the chute 17 and across the conveyor whereby it is positioned generally directly under or toward the left-hand side of the induction heater 21. At this point, a suitable rotating mechanism rotates said slab to the edgewise position. An example of such rotating means comprises a Y-shaped positioning device 50 pivotally mounted at 50' and having arms 51 and 52 disposed at right angles to each other and forming a V-shaped cradle which is rotatable 90° for picking up the slab and positioning it on one of its longer side edges. A lever 53 projects angularly from the juncture of the arms 51 and 52 and is at that point connected to the distal end of a piston rod 54 of a cylinder and piston motor 55 adapted to rotate the positioning device. It will be understood that a similar positioning device or other suitable means are provided for returning the slab to the horizontal position after it has been heated and returned to the conveyor, said means being provided either below the induction heater 21 or at some other point on the conveyor on the way to the mill.

From the edgewise position of a slab 18, as shown in broken lines at the left-hand side of FIG. 3, said slab is raised into the left-hand side of the induction heater 21 where it is deposited upon the walking lift beams 40 to be progressively advanced across the heater for subsequent lowering back onto the conveyor, as hereinabove described. During movement of the slabs across the heater, the induction coil 25 is energized from a source of preferably low frequency electrical current, either continuously or intermittently as may be desired, to attain a predetermined heat in each slab at the time it is lowered back onto the conveyor. As herein illustrated, the induction coil 25 is of the type disclosed in copending application Ser. No. 714,665 filed Mar. 20, 1968 wherein a single phase coil is divided along its axis into a plurality of coil sections, herein indicated at A, B, and C. It will be understood that each section comprises a plurality of turns of a coil conductor. As shown in FIG. 3, a pair of leads L1 and L2 are provided for supplying low frequency, single-phase current to the sections A, B, and C, at a predetermined voltage. Each coil section is separately connected across leads L1 and L2 by lines 64 and 65, respectively, in parallel with power factor control capacitances 66.

It will be understood that as illustrated in FIGS. 3 and 4, the slabs may vary in width; that is, in their vertical dimension when seated on one side edge for heating within the induction heater 21. Slabs of various widths are indicated at 18, 18a and 18b, all of which are of substantially greater length than width and of substantially greater width than thickness. Slabs of varying mass but having the same thickness will absorb a proportionate amount of electrical energy whereby they will heat to a uniform temperature in the same period of time without external adjustment of the applied current. The number of slabs disposed in a heater at one time will be determined by the tonnage requirements or capacity of the mill and the heating time possible with the energy applied based upon the electrical characteristics of the particular metal being heated. The induction coil can be provided in any suitable size affording a sufficient number of positions for heating slabs of a given size, the only practical limitation being the availability of electrical power.

Figure 5:
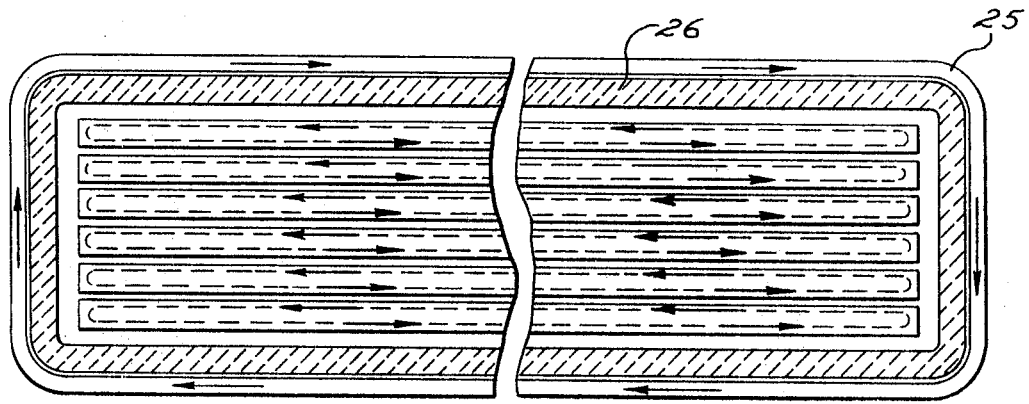
FIG. 5 is a top view in partial section of the induction heater showing the direction of the current in the induction coil and the direction of the induced current in the individual slabs.

FIG. 5 illustrates the relative directions of the applied current in the induction coil 25 and the induced current in any slabs 18, 18a and 18b. The direction of the currents are indicated by the arrows, and it will be noted that the induced current is the same in each slab regardless of the position at which it is disposed within the heater 21.

The means for directly supporting the slabs on the stationary supports 31, the walking lift beams 40, and the lift cylinders 46 and 46'; that is, the supporting blocks 34, insulation 35, and fingers 36, 36' and 36", are adapted to confine stray currents in the slab support substantially to the slab, proceeding in the direction of the length of the slab. A slab support of the type referred to is more fully disclosed in U.S. Pat. No. 3,485,986, dated Dec. 23, 1969.

FIG. 6 shows an alternative method for introducing and removing slabs from an induction heater according to the present invention. In FIG. 6, an induction heater 70 comprising an induction coil 71 and suitable refractory lining 72 is open at the upper end thereof, the lower end being provided with a walking beam apparatus 73 of the same general type as set forth above. In the modified form of the invention, adjustable grip tongs 74 carried by overhead crane means 75 enter the open top of the induction heater 70 either to place a new slab into the heater, as shown in full lines at the left-hand side of the drawing, or remove a heated slab, as shown in broken lines at the right-hand side of the drawing. The same adjustable grip tongs may be used for both introducing new slabs and removing fully heated slabs, or separate adjustable grip tongs may be used for these two functions if desired. It will be understood that each newly introduced slab is advanced from the left-hand to the right-hand side of the induction heater 70 during which time it is heated in the manner hereinabove described.

FIG. 12 shows a modified walking beam apparatus generally indicated at 80 which is substantially similar in construction to the walking beam apparatus 30 shown in FIG. 11 except in the formation of the support fingers for supporting the individual slabs. All other members and parts of the walking beam apparatus 80 remain unchanged and are given the same part numbers as those shown in the walking beam apparatus 30.

In the modified form 80 of the walking beam apparatus, the support blocks 34 and 34' are provided with like, modified support fingers 86 and 86'. In a similar manner, the blades 48 and 48' of the lift cylinders are provided with identical support fingers 86". Each said modified finger is provided with a downwardly open slot 87, 87' or 87" by means of which it is seated over its associated supporting block or blade in the manner described in connection with the embodiment of FIG. 11. The support fingers 86, 86' and 86" are modified by having a somewhat longer vertical dimension, their upper edges being provided with enlarged, upwardly open notches 88, 88' and 88", respectively, adapted to receive the lower edge portion of a slab 89. The modified fingers are particularly adapted for receiving and advancing slabs which would be inherently unstable due to a thickness of small dimension as compared with the width or vertical dimension of the slab. By seating the lower edges of the slabs within the slots 88, 88' or 88", such slabs may be walked or advanced across the heater in the manner set forth above. It is anticipated that in some instances modified fingers need be supplied only adjacent to one end of the heater whereby the slabs are only stabilized at one end as they are advanced across the coil. The exact number and positions of the modified fingers would depend upon the thickness and inherent stability of the particular slabs being treated, their overall length, etc.

FIG. 13 shows a further modified induction heater generally indicated at 91. The induction heater 91 comprises a suitable housing 92 preferably having a top cover 93 and sliding doors or panels 94 and 95 at either end of said top cover. The housing 92 encloses an induction coil 96 disposed upon a vertical axis, the turns of which define a rectangular opening adapted to receive a plurality of slabs 98 disposed therein in substantially the same manner as described in connection with the first embodiment; that is, with each slab being disposed upon one side edge thereof and with the longest dimension of the slab being parallel with one side of the induction coil 96.

Slabs 98 are delivered to and away from the induction heater 91 by a conveyor generally indicated at 99, all slabs moving in one direction as generally indicated by the arrow 100. A tilting mechanism 101 places each slab 98 on one side edge in the manner, for example, as described in connection with FIG. 3. The slab is picked up by adjustable grip tongs 102 which are carried by overhead crane means indicated at 103. The overhead crane means 103 is provided with wheels 104 by means of which it rides toward and away from the conveyor 99 on tracks 105 disposed on either side of the heater. Thus the adjustable grip tongs 102 can be moved from the conveyor 99 to either end of the induction heater 91 to either insert or remove a slab 98.

The doors or panels 94 and 95 are horizontally slidable to afford openings for inserting or removing the slabs from the ends of the heater. The slabs are moved horizontally in one direction; for example, from left to right as illustrated in FIG. 13, by means of a walking beam apparatus generally indicated at 106. It will be understood that the walking beam apparatus 106 operates substantially as those hereinbefore described having alternately fixed and movable support members 107 and 108, respectively, for shifting the slabs 98 through successive positions across the induction coil. Thus, a slab 98 can be picked up by the adjustable grip tongs 102, inserted into one end of the induction heater 91 adjacent to the panel 94, advanced across the heater to the opposite side adjacent to the panel 95, and removed from said heater at said opposite side to be returned to the conveyor 99 for conveyance to the mill.

FIG. 14 illustrates portions of an alternative walking beam construction, the modification being applied to the slab supporting portions and being adaptable for use in either the walking beam apparatus 30 or 106. A modified stationary support 110 has a vertical member 111 surmounted by an upwardly open, U-shaped channel 112 into which is seated an elongated refractory bar 113. The refractory bar 113 projects upwardly above the U-shaped channel 112 and affords a supporting surface for the slabs. A walking lift beam is shown at 115 which is substantially similar to the stationary support 110 in that it comprises a vertical member 111' surmounted by an upwardly open U-shaped channel member 112' which seats an upwardly projecting, refractory bar 113'. The walking lift beam 115 is movable in a cycle of movement to advance the slabs in exactly the same manner disclosed hereinabove. The refractory material of the bars 113 and 113' serves both as insulator and support thereby eliminating the need for separate fingers and insulation as shown in the embodiment of FIGS. 11 and 12.

From the foregoing it will be seen that the present induction heating apparatus affords improved means for obtaining increased production from a single induction heater. Because slabs of different widths can be heated at the same time, such different size slabs can be run through the same line thereby effecting substantial economies by eliminating the need for separate lines and heaters. The saving of space by such an arrangement will be obvious. Also, the slabs advancing across the heater may either be heated continuously or only at certain times; for example, during the times when the slabs are at rest, seated upon the stationary support member of the walking beams. Thus the heater apparatus provides a plurality of static heating positions for use when a heat-soak-heat cycle is desired.

It will be understood that many changes in the details of the invention as herein disclosed may be made without, however, departing from the spirit thereof or the scope of the appended claims.

We claim:

1. Apparatus for uniformly heating a plurality of elongated metal slabs each having a length substantially greater than the width thereof and a width substantially greater than the thickness thereof, said apparatus comprising an induction coil having a number of conductor turns substantially rectangular in form and disposed about a vertical axis; each said turn comprising two transversely spaced side conductors and two end conductors; said induction coil adapted to heat each of the plurality of slabs, each disposed on one of its longest side edges wholly within said coil, the longest dimension of the said slabs being disposed parallel with said side conductors whereby the magnetic field through the slabs is disposed substantially at right angles to the length and thickness of the said slabs, said coil having a transverse dimension sufficient to accommodate a plurality of side-by-side, transversely spaced positions therein; means for advancing each slab transversely from one side of said coil to the opposite side thereof while maintaining said slabs wholly within the coil by moving each of the slabs laterally to successive positions until each slab transverses said coil; and means for introducing each slab in relatively unheated condition into said coil adjacent to one side thereof and removing each slab in fully heated condition from the opposite side thereof, each slab following in successive sequential spaced movement through the coil a preceding slab.

2. Heating apparatus as set forth in claim 1: said means for advancing said slabs comprising a fixed support having means providing a plurality of said positions in said coil; a movable support having means providing slab support positions spaced apart transversely of the coil the same distance as the positions of said fixed support; means for moving said movable support in a cycle comprising lateral, vertically upward, reverse lateral, and vertically downward movements whereby said slabs are sequentially advanced transversely of said coil a distance equal to the distance between adjacent positions during each cycle.

3. Heating apparatus as set forth in claim 2: said movable support having means providing one more support position than said fixed support whereby each lateral movement of said movable support projects one or the other outermost support position of said movable support laterally beyond the fixed support; said means for introducing and removing each slab being adapted to deposit a slab on the outwardly projected movable support position in one laterally moved position thereof and receive a slab from the outwardly projected movable support position in the opposite laterally moved position thereof.

4. Heating apparatus as set forth in claim 3: said means for introducing and removing each slab comprising first vertically movable lift means disposed laterally beyond said fixed support on one side thereof; second vertically movable lift means disposed laterally beyond said fixed support on the opposite side thereof; said first lift means adapted to raise each slab to the general level of said fixed support whereby said movable support can move laterally and vertically upwardly to pick up a slab therefrom; said second lift means adapted to receive each said slab as a result of a reverse lateral and vertically downward movement of said movable support after each said slab has traversed the width of said coil, said second lift means lowering each said slab out of said induction coil.

5. Heating apparatus as set forth in claim 2: said means for introducing and removing the slab comprising overhead crane means adapted to lower each new slab into one side of said coil and lift each fully heated slab out of the opposite side of said coil.

6. Heating apparatus as set forth in claim 2: said support means comprising a plurality of rows of support fingers, each finger providing a horizontal, upwardly facing edge portion for supporting a portion of each slab; said fingers in each row being aligned in a direction parallel with said side conductors, and said rows being uniformly spaced apart in the direction of movement of the slabs across the heater, to provide said transversely spaced positions; the fingers of said movable support being disposed between fingers of said fixed support and movable laterally a distance equal to the distance between said spaced positions whereby to advance the slabs through successive positions across said heater.

7. Heating apparatus as set forth in claim 6: said upwardly facing edge portions of said fingers being disposed transversely of said slabs; at least certain of said edge portions having means providing upwardly open notches therein adapted to seat lower edge portions of the slabs and stabilizing said slabs at each said spaced position and during transfer between said spaced positions.

8. Heating apparatus as set forth in claim 1: said means for advancing said slabs comprising a plurality of fixed support members; a plurality of movable support members interposed between said fixed support members; each of said support members having means providing an elongated, upper slab supporting portion of refractory material disposed in the direction of movement of said slabs, said slabs being disposed across said supporting portions at right angles thereto; means for moving said movable support in a cycle comprising lateral, vertically upward, reverse lateral, and vertically downward movements whereby said slabs are successively picked up from said fixed support members by said movable support members and advanced transversely of said coil a distance equal to the distance between adjacent positions during each cycle.

9. Heating apparatus as set forth in claim 1: said means for advancing said slabs comprising a walking beam apparatus disposed below the coil opening and adapted to support said slabs at said positions and to advance said slabs to successive positions across said coil; a housing enclosing said coil around the sides and having a top cover; said top cover having movable panel means adjacent to said side conductors whereby said slabs can be inserted into said coil at said one side thereof and removed from said coil at said opposite side thereof; overhead crane means movable in a direction parallel with the direction of movement of said slabs; said crane means having gripping means suspended therefrom for successively introducing said slabs at said one side of the coil and successively removing fully heated slabs from the opposite side thereof.

10. The method of uniformly heating a plurality of elongated metal slabs each having a length substantially greater than the width thereof and width substantially greater than the thickness thereof, the method comprising providing an induction coil having a number of substantially rectangular turns disposed about a vertical axis, each turn comprising two transversely spaced side conductors and two end conductors; disposing the slabs sequentially in said coil adjacent to the side conductors on one side of the coil with the longest dimension of each slab disposed parallel with the side conductors and the widths thereof parallel with the axis of the coil whereby the magnetic field through each slab is disposed substantially at right angles to the length and thickness of the slab; sequentially moving each slab in the direction of the thickness thereof through a plurality of positions spaced transversely across the coil and concurrently sequentially introducing other slabs adjacent to said one side of the coil and removing fully heated slabs from adjacent to the opposite side of the coil, and energizing said coil.

11. The method of heating elongated metal slabs as set forth in claim 10 including maintaining the slabs at the spaced positions for a time period between each sequential movement of the slabs; and energizing the coil only during such time periods.

12. The method of heating elongated metal slabs as set forth in claim 10 wherein the coil is energized continuously as the slabs are advanced across the coil.